United States Patent Office 3,392,955
Patented July 16, 1968

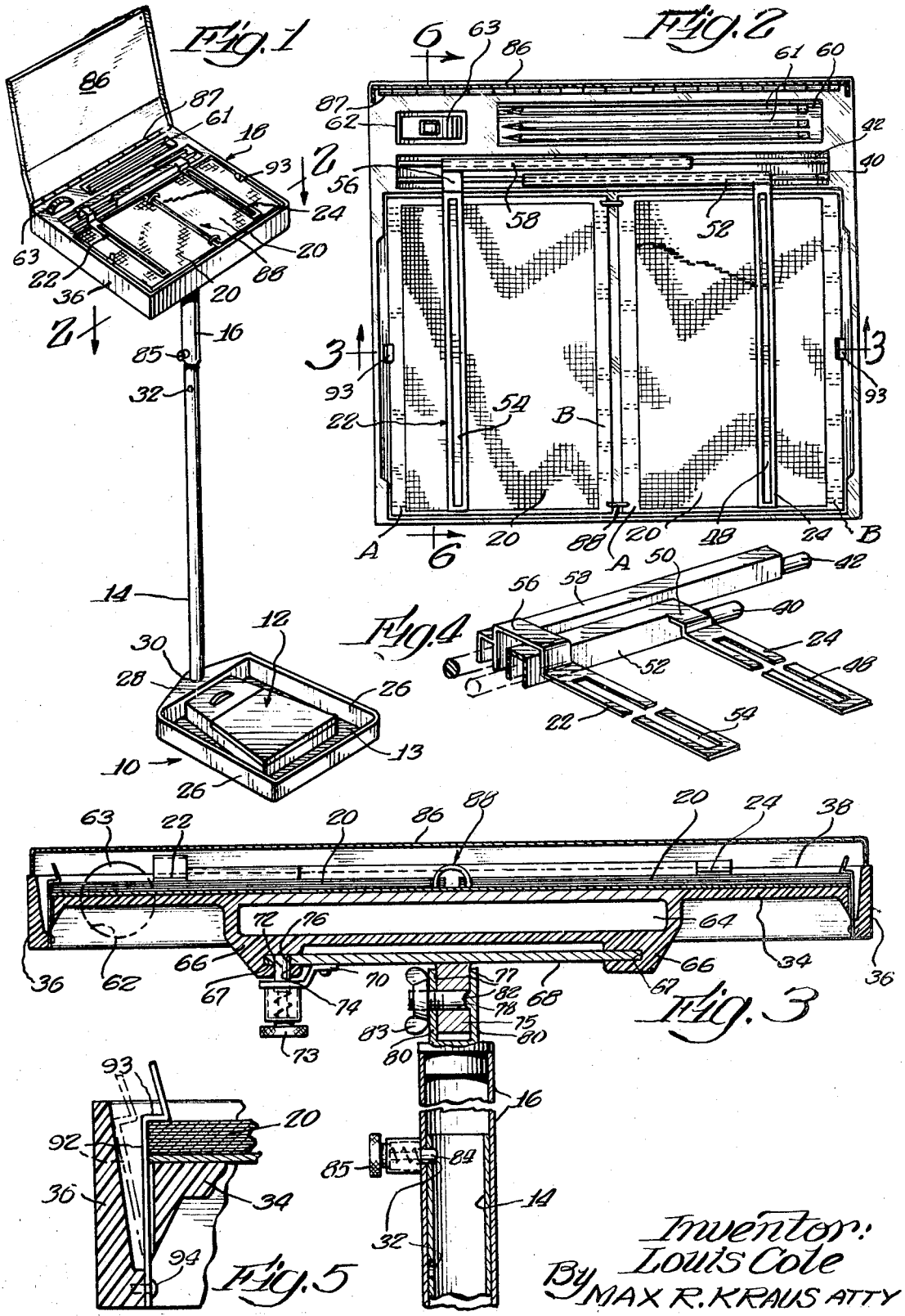

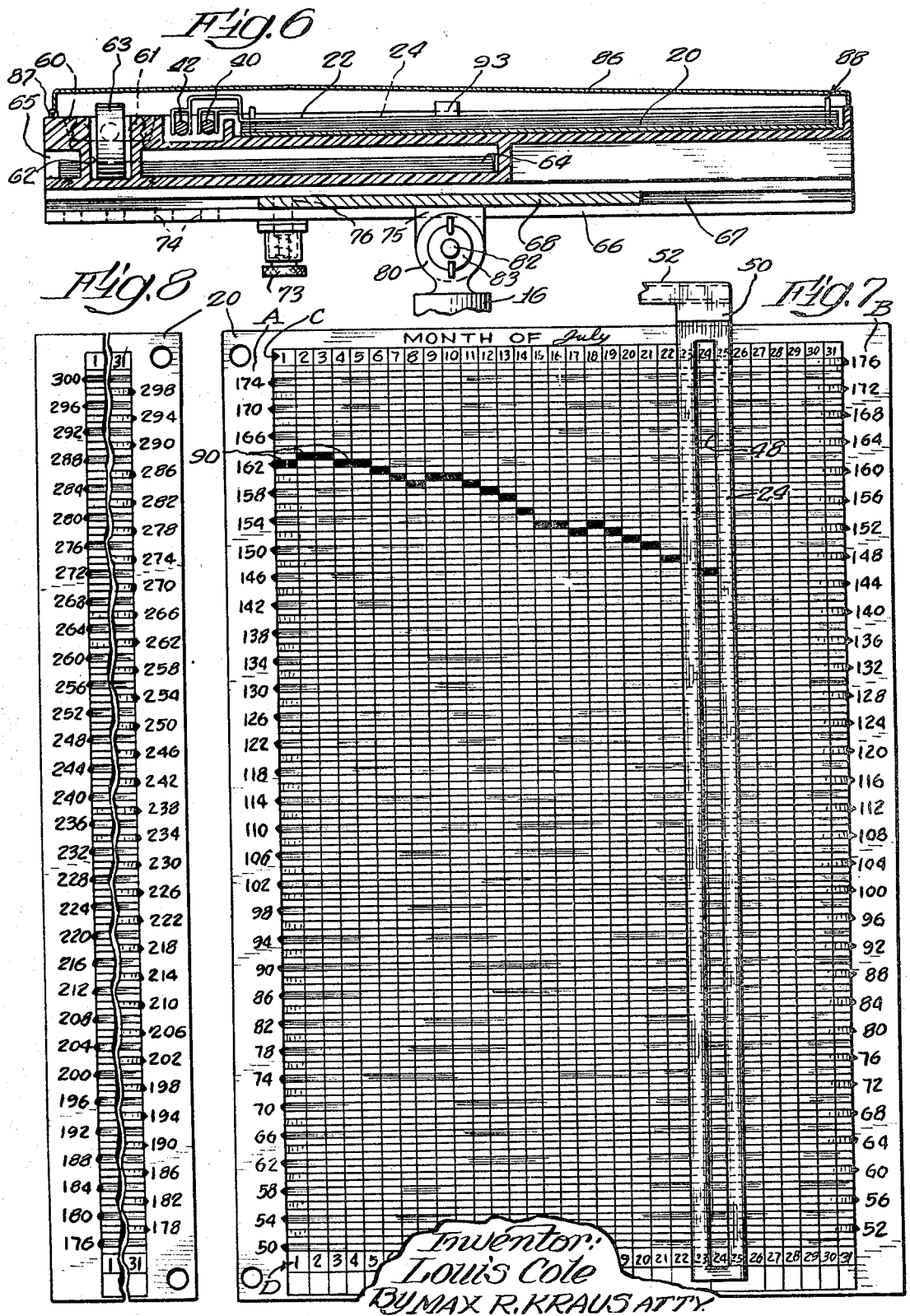

3,392,955
DEVICE WHICH INTEGRATES A BATHROOM
SCALE WITH A CHART OR RECORD SHEET
SO THAT ENTRIES MAY BE MADE THERE-
IN WHEN THE PERSON WEIGHS HIMSELF
Louis Cole, formerly known as Louis Cohen, 2130
Lincoln Park W., Apt. 14N, Chicago, Ill. 60614
Filed Nov. 26, 1965, Ser. No. 509,953
4 Claims. (Cl. 248—446)

ABSTRACT OF THE DISCLOSURE

A device having a base which supports a bathroom scale and a stand secured to the base and extending upwardly of the base for supporting a record sheet, whereby a person may stand on the scale to weigh himself and simultaneously manually record the weight in the record sheet.

Summary of the invention

One of the objects of this invention is to provide a device which will support a bathroom scale and a record sheet so that a person may record his weight at the time of weighing and maintain a continuous record thereof.

This invention relates to a device which integrates a bathroom scale with a chart or record sheet so that entries may be made therein when the person weighs himself.

One of the objects of this invention is to provide a device which integrates a bathroom scale with a chart or record sheet so that the chart or record sheet is directly in front of the person as he weighs himself, so that a recording can be made by the person simultaneously with the weighing, and wherein the weight or record chart over a period of time can be readily ascertained.

To provide an effective use of the bathroom scale to control a weight problem it is essential that one keep a daily record of his weight over a given period of time so that the weight fluctuations can be seen at a glance. With the use of the present day bathroom scales this is not feasible, since after the person weighs himself he does not usually enter the weight of in a record book or on a chart as it is not conveniently located nor is it associated with the scale. Therefore, a strict control of the weight becomes a haphazard procedure and as a result there is a tendency to put on weight without the realization thereof.

With the present invention the scale is supported in such a manner in relation to the record book that the two are associated or connected together so that when the person weighs himself on the scale the record book is open before him and he can enter the weight in the record book simultaneously with the weighing, and will know at a glance the weight fluctuations over a given period of time. This consciously brings to his attention his weight over a prescribed period as he weighs himself each day.

Another object of this invention is to provide a device of the foregoing character which is inexpensive to produce.

Other objects will become apparent as this description progresses.

In the drawings:

FIGURE 1 is a perspective view of the device forming this invention.

FIGURE 2 is a top plan view taken on line 2—2 of FIGURE 1.

FIGURE 3 is a sectional view taken on line 3—3 of FIGURE 2.

FIGURE 4 is an enlarged view, partly broken away, showing the slidable members which overlay the record sheets.

FIGURE 5 is a view showing the means for holding the record sheets in position.

FIGURE 6 is a view, partly in section, taken on line 6—6 of FIGURE 2.

FIGURE 7 is a view of one of the pages and showing one of the slidable members, and FIGURE 8 is a view of the other page but broken away.

Briefly described, the device includes a base member generally indicated at 10, in which the conventional floor or bathroom scale 12 is positioned. Secured to and extending upwardly of the base member is a tubular upright or post 14 which telescopically receives a tubular stem 16, which in turn is secured to a supporting plate which supports the table top generally indicated at 18, which in turn supports record sheets 20 in the form of a loose-leaf binder in which entries are made. The table top 18 supports a plurality of slidable members 22 and 24, which overlay the pages of the record book and which are manually slidable to aline with the numeral indicating the day of the month on the record page to permit a pencil notation or indicating line to be made on the record page.

More specifically, the base member 10 comprises a bottom 13 with upwardly extending walls 26 which form an enclosure for the conventional floor or bathroom scale 12 which is removably positioned in the base member. The rear wall of the base member has a widened portion 28 provided with an opening 30 which may be internally threaded to accommodate the lower end of the upright member 14. The lower end of said tubular upright or post is externally threaded so that it may be screwed into the threaded opening 30 of the base 10 to permit the upright to be removed for knockdown shipment. The upper end of the upright or post 14 is provided a plurality of spaced openings 32 to be engaged by a plunger on the tubular stem 16.

The table top generally designated by the numeral 18 is shaped to form a tray-like supporting surface, having a bottom wall 34 around which extends side and end walls 36. The side and end walls 36 extend upwardly of the bottom wall 34 and serve to form a ledge around the bottom wall to form a tray-like compartment 38 so that the record sheets may individually or within a loose-leaf binder be supported on the bottom wall 34 of the table top and be prevented from sliding or falling out from the table top.

Rearwardly of the compartment 38 the table top supports a pair of transversely extending rods 40 and 42, the opposite ends of which are suitably anchored in the walls of the table top. The transversely extending rods 40 and 42 guide the movement of the two manually slidable members 22 and 24. Each slidable member is adapted to overlay one of the two pages or record sheets.

Slidable member 24 comprises a rectangular-shaped strip having a central slot 48 extending substantially the length of the strip. The rear edge of the strip has an inverted L-shaped end 50 which connects to an inverted U-shaped member 52 which slidably engages the rod 40.

Slidable member 22 is also formed to provide a rectangular-shaped strip and has a central slot 54, similar to slot 48. The rear end of slidable member 46 has an inverted U-shaped end 56 which is connected to an inverted U-shaped member 58 which slidingly engages the rod 42.

The end 56 clears the member 52 so that each slidable member 22 and 24 may be manually slid without interfering with the other.

The rear portion of the table top 18 has a recessed portion 60 into which pencils 61 or other marking instruments may be inserted. It is also provide with a recess 62 for receiving a tape measure 63.

Extending below the bottom wall 34 of the table top is a compartment generally indicated at 64, which is best seen in FIGS. 3 and 6, which is centrally and rearwardly positioned. Compartment 64 has an entrance opening 65 at the rear of the table top. Extending below said compartment is a pair of spaced side members 66, each of which is provided with an inwardly facing slot 67. A supporting plate 68 is received within the slots 67.

A bracket 70 is fixedly secured to the supporting plate 68 and said bracket supports a spring biased plunger 72 which has a manually operable knob 73 for retracting the plunger. One of the side members 66 is provided with an opening 74 through which the plunger 72 extends, as best seen in FIG. 3. The plunger 72 is adapted to selectively engage any one of the plurality of openings 76 along the side of the supporting plate 68 to lock the table top in position relative to the supporting plate 68 With this arrangement the table top 18 may be slid forwardly or rearwardly relative to the supporting plate 68 and locked in such moved position.

Exending downwardly of the supporting plate 68 is a stud 75 having opposite flat sides 77. The stud has a transverse opening 78. The stud 75 is received between the spaced end walls 80 extending upwardly of the stem 16, and the transverse opening 78 engages a threaded bolt 82 extending between said end walls. The end of the bolt supports a wing nut 83 for tightening purposes The supporting plate 68 which supports the table top 18 is therefore pivotally supported on the bolt 82 and the angle of the supporting plate 68 may be adjusted as desired. The table top 18 is slidable with respect to said plate 68 and is locked in position by means of the manually actuated plunger 72.

The tubular stem 16 fits over the upright post 14 in a telescopic relation and may be raised or lowered with respect to the post. The tubular stem carries a spring biased plunger 84 which engages the openings 32 in the tubular post 14. The plunger has a knob 85 for manually withdrawing the plunger. Thus, the tubular stem 16 may be raised or lowered in relation to the post 14 and locked therewith. The height of the table top may therefore be raised or lowered and the table top may be adjusted to different angular positions as desired.

A cover member 86 is hingedly secured, as at 87, to the rear of the table top 18 and said cover may be moved to open and closed positions over the top of said table top. The open position is shown in FIG. 1 and the closed position is shown in FIG. 3.

The record sheets generally indicated at 20 are shown supported in a loose-leaf binder 88 which is positioned within the borders of the table top 18. The loose-leaf binder is positioned in an open position with record sheets 20 on both sides. The sheets are printed with the appropriate indicia, as best shown in FIGS. 7 and 8.

Referring to FIG. 7, it will be seen that the numerals indicating the weight are positioned in vertical columns along each of the opposite sides. In vertical column A on the left side of the record sheet and starting from the bottom, the numeral 50 appears and goes up to the numeral 174. On the opposite side of the sheet in vertical column B the starting numeral is 52 at the bottom and goes up to the numeral 176. Thus, the numbers in column A are staggered with respect to the numbers in column B and may be large enough to be clearly discernible. Extending horizontally across the top and bottom of the sheet are columns of numerals C and D to indicate the day of the month. This sheet has punched holes on the left side and is intended with the loose-leaf binder in open position to face upwardly and be positioned on the right side, as shown in FIG. 2.

The slidable member 24 is movable over this sheet and the sheet is marked with horizontal line markings 90, as shown in FIG. 7. For example, if the date is July 1, the slidable member 24 would be moved to the left so that the vertical slot 48 of said slidable member would be alined with the vertical column under the numeral 1. After the person weighs himself, and say, for example, his weight is 162, a line 90 is drawn adjacent the numeral 162 through the slit 48 of the slidable member. Assuming that on July 2 the weight is 163, the slidable member is moved so that the vertical slot 48 alines with vertical column under numeral 2 and another horizontal line 90 is drawn in said column. Then on July 3 if the weight is 163 the slidable member is shifted to the column under numeral 3 and a horizontal marking is made through the slot 48. This procedure is followed for each day. As shown in FIG. 7, the person can, by following the horizontal markings 90 on the sheet, readily appraise his weight and see whether he is consistently gaining or loosing. A 31 day record can be quickly evaluated.

The sheet on the left in the loose-leaf binder is as shown in FIG. 8, and here the readings on the left are from 176 to 300. The readings on the right are from 178 to 298. This sheet would be marked in the same manner as the sheet in FIG. 7, depending of course upon the weight that one has to register.

With respect to the sheet shown in FIG. 8, the slidable member 22 is moved over said sheet so that the slot 54 in said member alines with the respective date and the recordings are made therein in the same manner as shown in FIG. 7.

If desired, the double sheets could be eliminated and one sheet could be used, the only difficulty being that if all of the weight numbers from 50 to 300 were put on one sheet they might be too small to be easily read. For this reason it was believed that two sheets would be preferable in order to permit bigger sized numbers to be used.

As best shown in FIG. 5, fingers 92 having a hooked end 93 are secured to the table top as at 94 and engage the record sheets for holding them in position.

It will be understood that various changes and modifications may be made from the foregoing without departing from the spirit and scope of the appended claims.

What is claimed is:

1. A device of the character described comprising a base member adapted to rest on a floor surface, said base member having means to support a bathroom scale thereon in a horizontal position to permit a person to stand on the scale, an upright member secured to said base member and extending upwardly of said base member adjacent to the rear end of said base member so that the bathroom scale is postioned wholly forwardly of the upright, a table top secured to said upright member for supporting a record sheet in a position above said base member so that said record sheets is in front of the person as he is standing on the bathroom scale, said table top being secured to said upright in a position wherein the table top does not obstruct the view of the scale portion of the bathroom scale when the person is standing on the scale, said base member having means for retaining the scale member against accidental displacement of the scale member.

2. A device defined in claim 1 wherein the base member defines a well within which the bathroom scale fits to prevent accidental displacement of the scale.

3. A device defined in claim 1 in which the means for retaining the scale member is a wall extending upwardly of the base member.

4. A device defined in claim 1 in which a pair of slidable members are connected to the table top and are adapted to overlay the record sheet, each slidable member having a slot therein through which a marking may be made on the record sheet.

References Cited

UNITED STATES PATENTS

| | | | |
|---|---|---|---|
| 543,492 | 7/1895 | Laughlin | 108—6 X |
| 756,631 | 4/1904 | Herbert | 108—6 X |
| 1,652,774 | 12/1927 | Fraser | 108—8 X |
| 1,898,666 | 2/1933 | Isaacson | 108—6 |
| 2,208,462 | 7/1940 | Livermon | 248—446 |
| 2,260,695 | 10/7941 | Self | 108—5 |
| 2,430,862 | 11/1947 | Carscallen | 108—23 |

CHANCELLOR E. HARRIS, *Primary Examiner.*